United States Patent [19]

Graf et al.

[11] Patent Number: 5,011,046

[45] Date of Patent: Apr. 30, 1991

[54] PUMP DISPENSER HAVING VALVED PRESUCTION CHAMBER AND OUTLET

[75] Inventors: Lothar Graf, Rielasingen-Worblingen; Karl-Heinz Fuchs, Radolfzell, both of Fed. Rep. of Germany

[73] Assignee: Ing. Erich Pfeiffer GmbH & Co. KG, Fed. Rep. of Germany

[21] Appl. No.: 316,083

[22] Filed: Feb. 27, 1989

[30] Foreign Application Priority Data

May 8, 1987 [DE] Fed. Rep. of Germany ....... 3715301

[51] Int. Cl.[5] .............................................. G01F 11/04

[52] U.S. Cl. .................................... 222/321; 222/385; 239/333

[58] Field of Search ............... 222/321, 380, 372, 383, 222/385; 239/333

[56] References Cited

U.S. PATENT DOCUMENTS

| | | | |
|---|---|---|---|
| 4,025,046 | 5/1977 | Boris | 222/321 X |
| 4,089,442 | 5/1978 | Hafele et al. | 222/321 |
| 4,230,242 | 10/1980 | Meshberg | 222/321 |
| 4,361,255 | 11/1982 | Saito et al. | 222/321 |
| 4,511,069 | 4/1985 | Kalat | 222/321 X |
| 4,821,928 | 4/1989 | Su | 239/333 X |

FOREIGN PATENT DOCUMENTS

| | | |
|---|---|---|
| 0014754 | 12/1979 | European Pat. Off. . |
| 2749644 | 11/1978 | Fed. Rep. of Germany . |
| 2732888 | 2/1979 | Fed. Rep. of Germany . |

*Primary Examiner*—Kevin P. Shaver

*Attorney, Agent, or Firm*—Eckert Seamans Cherin & Mellott

[57] ABSTRACT

In a dispenser a manually operable thrust piston pump (2) has a presuction piston (11) located with a limited spacing within a pump piston (10) and which in the manner of a telescopic tube engages over a cylindrical, freely projecting chamber body (15) and consequently bounds a presuction chamber (17) constantly connected by a line to a container and whose length and volume are significantly greater than that of a pump chamber (20) surrounding presuction chamber (17). The two working pistons slideably guided on one another form valve closures of an outlet valve (23) controlled by pressure difference and which at the end of the pump travel and in addition to said control, can be mechanically opened by a dog (40) positionally variable by means of a compressible neck (29) for venting the pump chamber (14).

24 Claims, 4 Drawing Sheets

PUMP DISPENSER HAVING VALVED PRESUCTION CHAMBER AND OUTLET

BACKGROUND OF THE INVENTION

1. Field of the Invention

The invention relates to a dispenser for manually discharging media like liquids or other flowable substances.

2. Prior Art

In a discharging apparatus of this type the pump chamber in the form of a separate cup-shaped chamber body inserted in the cylinder casing or block is surrounded by the presuction chamber. This construction has proved very satisfactory.

SUMMARY OF THE INVENTION

An object of the invention is to provide a discharging apparatus of the aforementioned type, which permits an even more compact and simple construction.

According to the invention this object is achieved in the case of a discharging apparatus of the aforementioned type in that the presuction chamber, at least partly located within the pump chamber, is surrounded by the latter. In place of an axially successive arrangement of the two pistons, preferably the pump piston and the presuction piston engage in one another over at least part of their axial extension, so that the piston unit can be given a very short construction.

As a result of the inventive construction an outer circumferential surface instead of an inner circumferential surface can be associated as the piston path with the presuction piston, so that the latter is loaded in a radially inwardly narrowing manner with increased pressure in the pump chamber and is consequently particularly well sealed.

Appropriately the two pistons have piston sleeves located within one another with only a limited clearance of approximately 1/10 to 3/10 mm, so that the pump chamber during each pump lift or travel can be almost completely emptied and therefore a very accurate dosing of the discharged medium quantity is ensured.

For operating an outlet valve in the direction of the pump travel, the two telescoped pistons can be mounted displaceably on one another and for operating an inlet valve the presuction piston can comprise two parts displaceable against one another in the direction of the pump travel. The inlet valve, located directly in the vicinity of the presuction piston and optionally functioning in the manner of a slide control, serves as an overflow valve between the presuction chamber and the pump chamber, so that between the presuction chamber and the reservoir there is no need for a separate inlet valve and there is instead merely a constantly open line connection.

In order to obtain a very rapid filling, even when the chambers are empty, a mechanically opened pressure relief connection is provided in the travel end position of the pump unit for venting the pump chamber. If this pressure relief connection is formed by stop-limited opening of the outlet valve, no separate air duct is required and in addition the outlet valve can be constructed in such a way that in the case of medium-filled pump chambers it opens before reaching the travel end position under the pressures occurring during the pump travel, so that the outlet valve is opened mechanically below a predetermined pressure and by pressure difference above a given pressure.

The inventive discharging apparatus can be constructed in simple manner in such a way that it operates equally well in all positions and even overhead in the initial piston unit position an outflow of the reservoir through the discharging apparatus is prevented.

These and further features of preferred developments of the invention can be gathered from the description and drawings, whereby the individual features can be realized in an embodiment of the invention and in other fields either singly or in the form of subcombinations.

BRIEF DESCRIPTION OF THE DRAWINGS

Embodiments of the invention are described hereinafter relative to the drawings, wherein are shown.

DETAILED DESCRIPTION OF THE PREFERRED EMBODIMENTS

Figure 1:
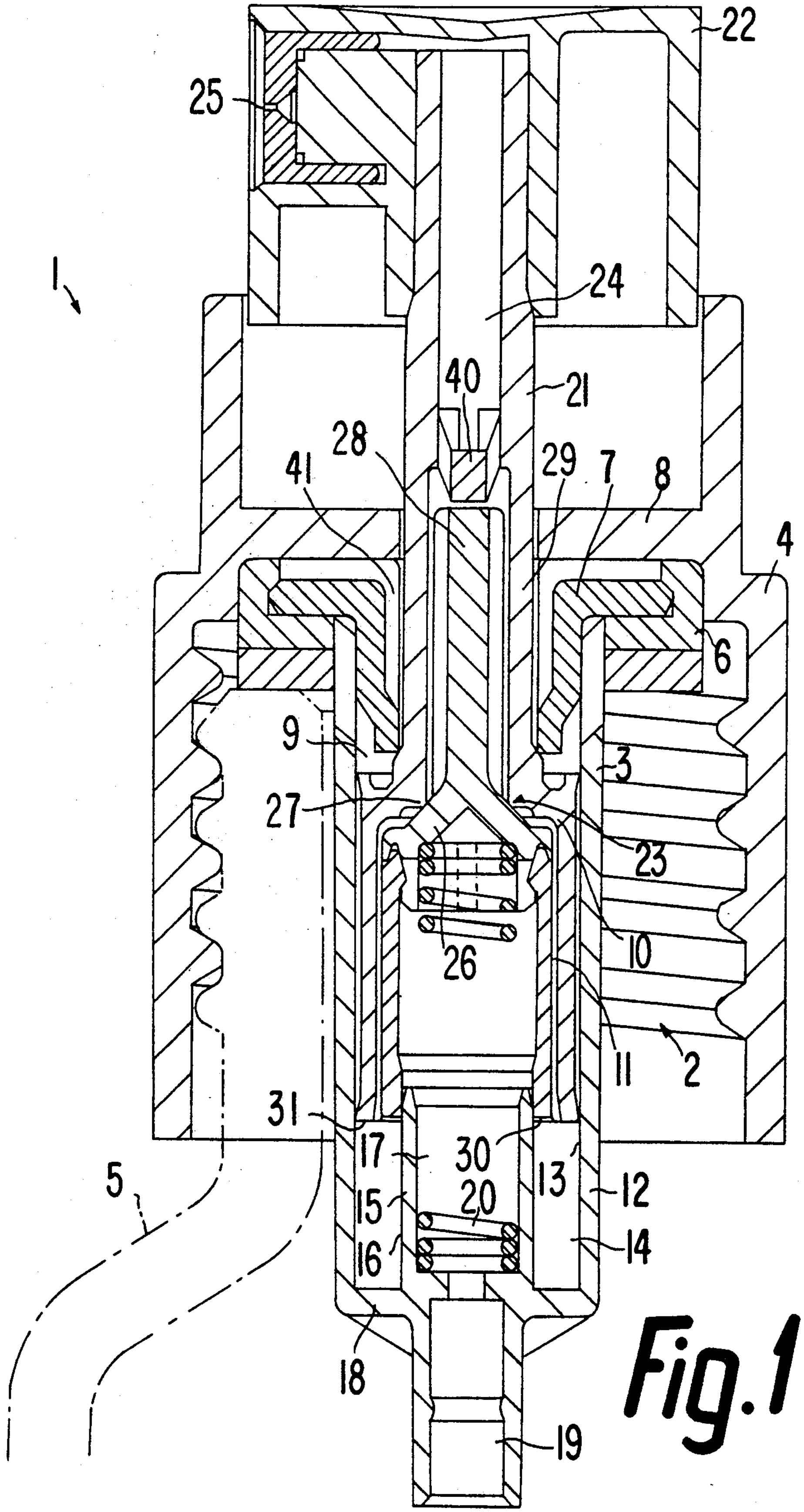
FIG. 1: an inventive discharging apparatus in axial section and in the starting position.
Figure 2:
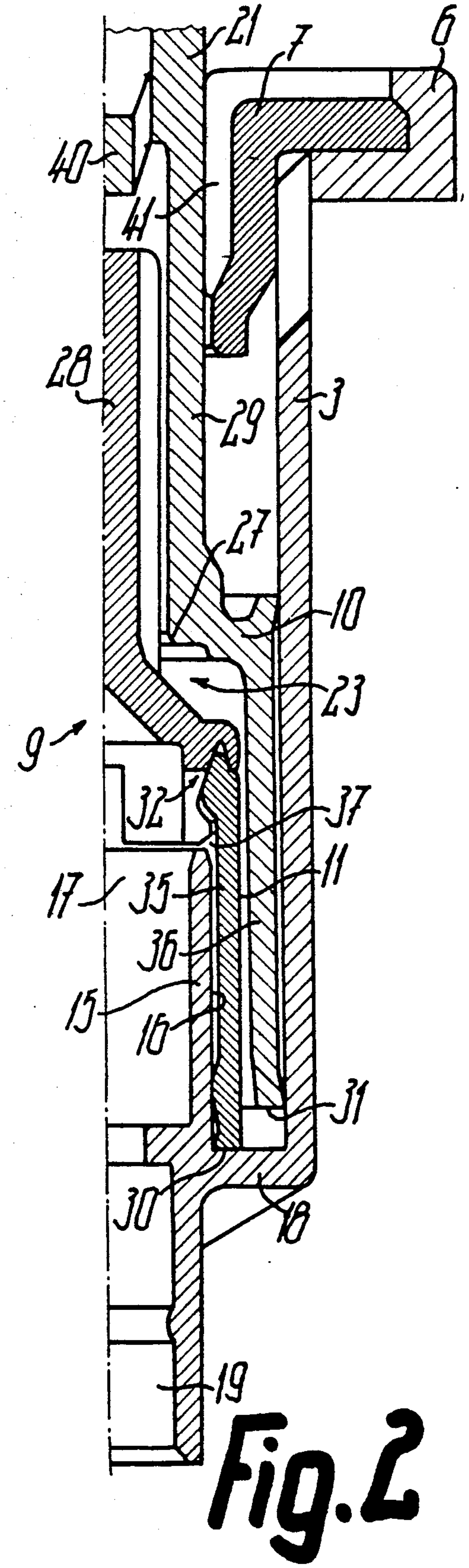
FIG. 2: a detail of FIG. 1 on a larger scale and shortly before reaching the travel end position of the piston unit.
Figure 3:
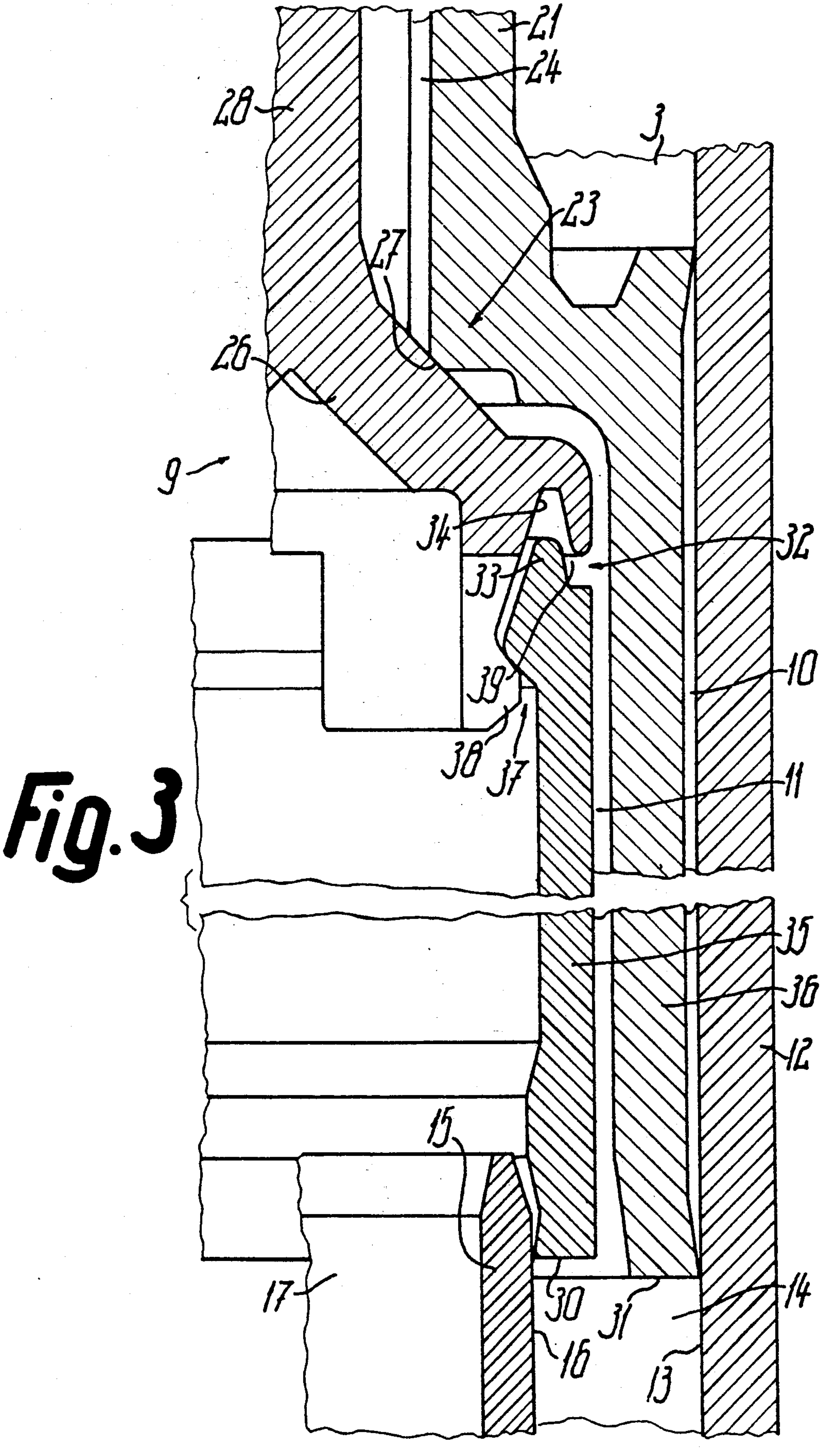
FIG. 3: an even larger scale detail of FIG. 1, but at the end of the return travel.

As shown in FIGS. 1 to 3, an inventive discharging apparatus 1 has a pump 2 providing a substantially cylindrical cylinder casing or block 3 extending over most of its length and which is sealingly fixed with a cap 4, e.g. constructed as a screw cap on the neck of a container 5 serving as a reservoir, so that it only engages with a limited gap spacing in the container neck and is located within the latter over most of its length. At its outer or rear end, the cylinder block is provided with an annular flange 6 constructed in one piece therewith and projecting radially from its outer circumference and with which it is braced against the end face of the container neck, accompanied by the interposing of a seal. Said outer end of the cylinder block 3 is essentially closed with a cylinder cover 7, which has a sleeve shoulder engaging in the cylinder block and an annular flange part located in annular flange 6, which snaps from the outer end face into an inner groove of annular flange 6 and is consequently fixed. The outer end faces of annular flange 6 and cylinder cover 7 engage against an annular partition 8 of cap 4, enabling the cylinder cover 7 to be pressed against annular flange 6 in its sealing fixing position.

In cylinder block 3 is displaceably mounted a piston unit 9, has two coaxially telescoped, substantially cup-shaped working pistons, whose cup openings are directed towards the inner end of the cylinder block 3, namely an outer pump piston 10 and a presuction piston 11 located within the same. The inner end of cylinder block 3 forms a cylinder 12 with a piston path 13 for two successively positioned annular sealing lips of pump piston 10, which are provided in the vicinity of both ends of said pump piston 10 and which are oppositely widened in frustum-shaped manner up to the sealing edges. A presuction cylinder 15 projecting freely against piston unit 9 is positioned in spaced manner from the piston path 13 of cylinder 12 and within the latter and which is constructed in one piece with the cylinder block 3, while projecting from an annular base wall 18 forming the inner end of cylinder 12. A connecting piece for a riser tube e.g. extending into the vicinity of the bottom of container 5 and which bounds an intake tube 19 projects from the outer end face of said base wall 18. The outer circumferential surface of the presuction cylinder 15 forms the piston path 16 for the presuction piston 11 and which engages over the presuction cylinder 15 in each piston position in slipped over manner and is guided on the piston path 16 with an annular sealing lip provided on its front end. The annulus between the cylinder 12 and the presuction cylinder 15 and in which run the two pistons, forms the pump chamber 14, while the space bounded by the presuction cylinder 15 and the interior of presuction piston 11 forms the longer presuction chamber 17, in which is located a restoring spring 20 in the form of a compression spring for piston unit 9.

At the rear end of piston unit 9 is provided a substantially cylindrical piston shaft 21 directly connected or constructed in one piece with the pump piston 10 and which traverses with clearance both the cylinder cover 7 and the partition 8 and on its outer, diameter-reduced end is placed a control head 22. The tubular piston shaft 21 defines a discharge tube 24 connected to the pump chamber 14, whilst interposing an outlet valve 23 and which leads to an outlet opening 25 in control head 22. In each position, control head 22 engages in a collar of cap 4 projecting from partition 8.

The end of the presuction piston 11 facing the presuction chamber 17 is closed by an end wall, which forms a frustum-shaped valve closure 26 of outlet valve 23, whose valve seat 27 is located in the associated end wall of the pump piston 10, connected to piston shaft 21 at the inner end of the outlet tube 24. Presuction piston 11 or valve closure 26 is axially displaceably guided with an axially slotted shaft 28 in an internal diameter-widened portion of piston shaft 21 or outlet tube 24, in such a way that by displacement counter to the tension of restoring spring 20, it is possible to open the outlet valve 23. Said portion forms a neck 29 of piston shaft 21 which, compared with the remaining piston shaft portions located between pump piston 10 and control head 22, has a thinner wall and can be elastically compressed, accompanied by a bulging widening. Radially outside valve seat 27, valve closure 26 forms a piston end face exposed to the pressure in pump chamber 14 via the annular clearance between the two working pistons and which has a larger surface than the front, annular end face 30 of presuction piston 11. On operating the discharging apparatus 1 by pressing down the control head 22 counter to the tension of restoring spring 20, the front sealing lips of the two working pistons are tightly pressed against the piston paths 13,16 under the pressure which builds up and on reaching a predetermined pressure the outlet valve 23 is opened by the differential pressure counter to the tension of the restoring spring 20 loading said outlet valve 23 towards the closed position. The presuction piston 11 is forwardly displaced with respect to the pump piston 10 in such a way that e.g. front face 30 of the presuction piston 11 is in advance of the front face 31 of pump piston 10 in accordance with FIG. 2. If the front face 30 of presuction piston 11 now strikes against the base wall 18 and piston unit 9 is even further advanced, then the pump piston 10 or valve seat 27 are moved with respect to the presuction piston 11 into the direction of the closed position of the outlet valve 23, so that the passage cross-section of said valve 23 is considerably reduced. As the front face 30 is slightly set back compared with the front face 31 when outlet valve 23 is in the closed position, said outlet valve is not completely closed and instead this only takes place through restoring spring 20 following a corresponding pressure reduction.

For filling the pump chamber 14 from presuction chamber 17 an overflow valve 32 is provided, which opens and closes mechanically as a function of the movement direction of piston unit 9 or presuction piston 11 and is constructionally combined with the latter in such a way that both its valve closure 33 and its valve seat 34 are located on presuction piston 11. For this purpose the presuction piston 11 has a piston sleeve 35 formed by a separate component, which is connected to the piston end wall or the valve closure 26 of outlet valve 23 so as to be axially movable to a limited extent between an open and a closed position by means of a snap connection 37. This piston sleeve 35, which extends almost over the entire length of the corresponding piston sleeve 36 of pump piston 10, forms with its rear end face the cross-sectionally rearwardly narrowed valve closure 33 which passes round the pump axis and with which is associated as the valve seat 34 a cross-sectionally complementary annular groove in the front face of the piston end wall. On the inner circumference of piston sleeve 35 are provided several radially resilient snap members 38, uniformly distributed over the circumference and projecting in one piece from the piston end wall, which have radially outwardly projecting snap cams and which are associated with an inner ring shoulder of piston sleeve 35 serving as a counter member. Thus, they are spaced from the valve seat 34 in such a way that the piston sleeve 35 can be moved out of the closed position tightly engaging in valve seat 34 axially forwards until it strikes against the piston and into an open position, in which the overflow valve 32 in the vicinity of the rear end of presuction piston 11 frees a valve passage 39 between the presuction chamber 17 and the annular clearance bounded by the piston sleeves 35,36.

If piston unit 9 is moved out of the starting position in the direction of the pump lift or travel then, as a result of the friction between presuction piston 11 and piston path 16, the valve closure 33 is pressed in closing manner against the valve seat 34, so that the pressure in pump chamber 14 cannot escape through the overflow valve 32 into the presuction chamber 17. During the return travel movement, as a result of said friction, the valve closure is drawn out of the valve seat 34 until it abuts, so that as a result of the underpressure building up in the pump chamber 14 medium is sucked through the open overflow valve 32 out of presuction chamber 17 and into pump chamber 14.

The piston shaft 21 forms a dog 40 constructed in one piece therewith and facing the rear end of the shaft 28 and which, when the outlet valve 23 is closed, is located at a limited distance from the mating surface of the valve closure 26 or shaft 28 formed by the rear end face. If the pump piston 10 is in its travel end position engaging with base wall 18, then the neck 29 is no longer located within the cylinder cover 7 and is instead positioned freely over most of its length within the cylinder block. If the control head 22 is now further pressed, then the neck 29 is widened or shortened by compression, so that the dog 40 runs up onto the shaft 28 and carries along the latter until, with the overflow valve 32 closed, the end face 30 of presuction piston 11 is also fixed by abutting against the base wall 18. Outlet valve 23 is then opened with a relatively small opening cross-section, so that optionally an effective venting of pump chamber 14 can take place.

For the guidance of the outer circumference of neck 29, cylinder cover 7 has uniformly circumferentially distributed longitudinal ribs 41, which at rear ends pass into radial ribs on the outer end face of the annular flange part of cylinder cover 7, which engage with their rib edges on partition 8. The front ends of longitudinal ribs 41 are set back with respect to the associated end of the sleeve shoulder of cylinder cover 7, so that said, diameter-reduced end can form a valve seat of a ventilating valve closed in the starting position of piston unit 9 and whose valve closure is formed by a frustum-shaped portion of piston shaft 21 connected to the end wall of pump piston 10. The ventilating valve is used for ventilating the container 5 and for this purpose vents are provided behind pump piston 10 in the wall of cylinder block 3 and which are substantially covered by the sleeve shoulder of cylinder cover 7. Even if the neck 29 does not have an adequate elasticity for stretching, through the longitudinal ribs 41 it is necessarily returned to its stretched or unpressed position during the return travel.

Figure 4:
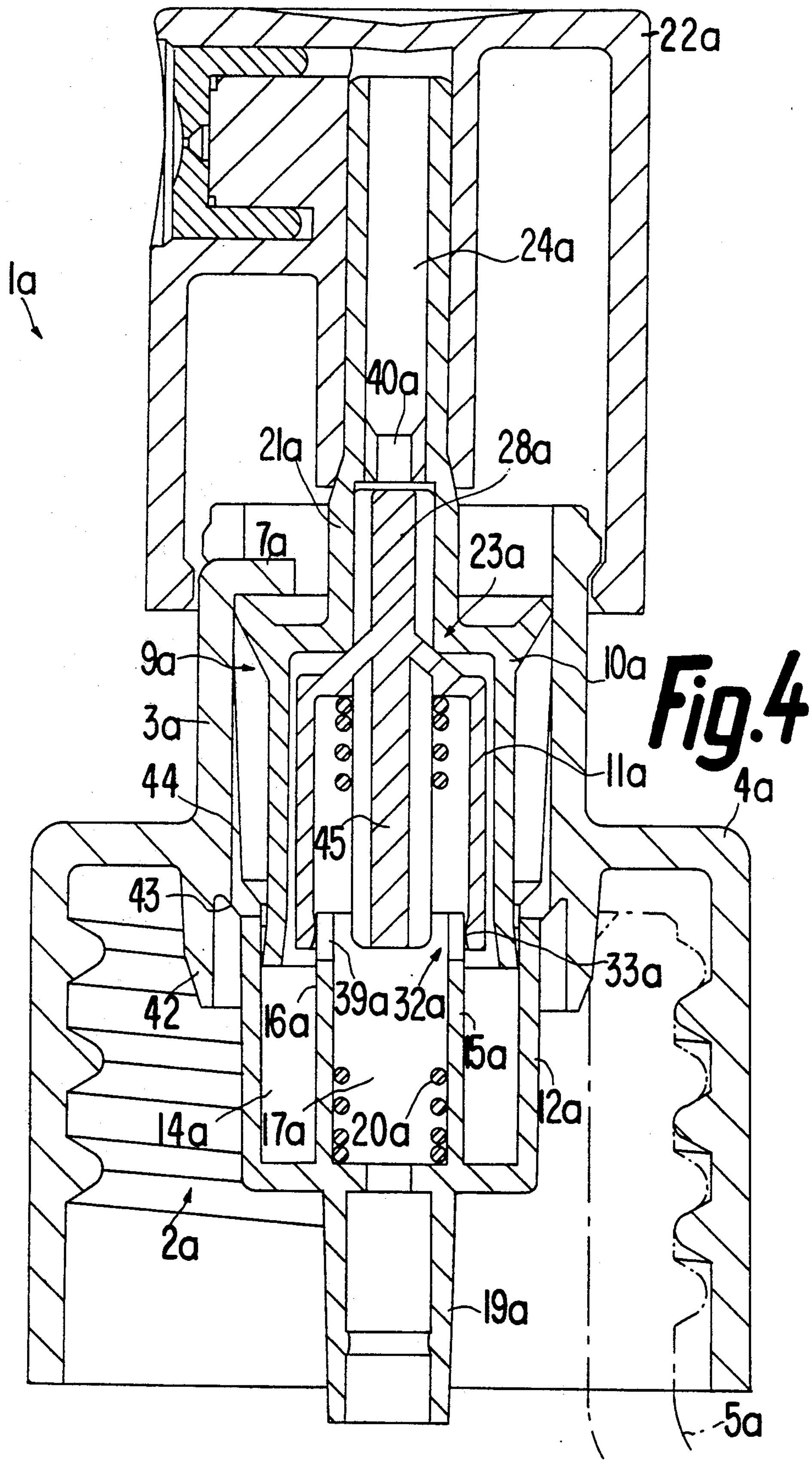
FIG. 4: another embodiment of a discharging apparatus in a representation corresponding to FIG. 1.

In FIG. 4 corresponding parts are given the same reference numerals as in the remaining drawings, but followed by the letter a. The diameter of cylinder casing 3*a* is so stepped, that an outer casing part freely projecting over the end wall of cap 4*a* is wider and an inner part forming cylinder 12*a* is narrower, the rear sealing lip of piston 10*a* being guided in the wider part and which has a correspondingly larger diameter than the front sealing lip guided in cylinder 12*a*. Cylinder casing or block 3*a* is constructed in one piece with cap 4*a* and over the inside a socket part 42, constructed in one piece with cap 4*a*, projects from its end wall and which on the outer circumference is so conically tapered in approximately acute-angled manner towards its end, that it engages, in place of a separate seal, under sealing pressing in the inner circumference of the container neck. Socket part 42 spacedly surrounds cylinder 12*a*, so that it forms an annular groove open towards the container and whose base face is substantially bounded by an annular shoulder between the wider and narrower parts of cylinder casing 3*a*. Said annular shoulder has passage openings 43 connecting the space behind the front piston lip of pump piston 10*a* to the container. On the inner circumference of the wider part of the cylinder casing 3*a* are provided longitudinal channels 44, which are connected to the passage openings 43 and when the pump piston 10*a* is in its starting position terminate upstream of its rear piston lip. Each longitudinal channel is formed by at least one longitudinal rib projecting over the inner circumference of the cylinder casing 3*a* and sloping upwards under a shallow angle in the direction of the pump travel and onto which runs the rear piston lip during the pump travel, whereby it is moved radially inwards in such a way that on either side of the longitudinal rib openings are freed as a result of the elastic deformation of said piston lip. The rear end of cylinder casing 3*a* is not closed by a separate cylinder cover, but is bounded by jacket tongues 7*a* bent radially inwards, e.g. by ultrasonics from the jacket of cylinder casing 3*a* and which serve as a stop for the pump piston 10*a* in the starting position. It is possible to provide several, e.g. three jacket tongues 7*a* uniformly distributed over the circumference and in this case the control head 22*a* appropriately engages over cylinder casing 3*a* on the outer circumference and is secured in its starting position by a stop with respect to the cylinder casing 3*a*. For this purpose, cylinder casing 3*a* is provided at its outer end with a collar projecting over its outer circumference and over which is placed the cap-like control head 22*a* with a corresponding collar provided on its inner circumference, this being achieved by resilient snapping on.

In this case the overflow valve 32*a* is constructed as a slide valve located in the vicinity of the front end of presuction piston 11*a* and whose valve closure 33*a* is formed by the front piston lip of the presuction piston 11*a*. At the free end of presuction cylinder 15*a* are provided overflow openings 39*a* in the form of e.g. longitudinal slots, which are freed by the valve closure 33*a* in the starting position of piston unit 9*a* in such a way that they form a connection between the presuction chamber 17*a* and the pump chamber 14*a*. As soon as the presuction piston 11*a* has moved over a first small distance in the direction of the pump travel, said overflow openings 39*a* are closed.

In its interior, the pump piston 11*a* has a freely forwardly projecting ram 45, which essentially forms an extension of shaft 28*a* and which in the front end position of presuction piston 11*a* strikes against the base wall of presuction chamber 17*a*, so that only very limited impact forces act on the presuction piston sleeve.

We claim:

1. A dispenser for manually dispensing media, said dispenser comprising:

at least one manually operable thrust piston pump having a casing and at least one piston unit with at least one pump piston, the piston unit being movable in at least one pump cylinder along a cylinder path over a pump stroke from an initial position to a stroke end position;

a pump chamber being defined between said pump cylinder and said pump piston, said pump chamber being connectable to an inlet for filling the pump chamber from a reservoir, and for discharge purposes being connected to an outlet duct leading to an outlet port;

a presuction chamber with a presuction piston associated with an inlet side of said pump chamber, overflow means being provided for ductively connecting said presuction chamber to said pump chamber, and means being provided for closing said presuction chamber during the pump stroke with respect to the pump chamber; and, an outlet valve associated with said outlet duct, and further comprising means for positively at least partially opening said outlet valve substantially at stroke end position.

2. A dispenser for manually dispensing media, said dispenser comprising:

at least one manually operable thrust piston pump having a casing and at least one piston unit with at least one pump piston, the piston unit being movable in at least one pump cylinder along a cylinder path over a pump stroke from an initial position to a stroke end position;

a pump chamber being defined between said pump cylinder and said pump piston, said pump chamber being connectable to an inlet for filling the pump chamber from a reservoir, and for discharge purposed being connected to an outlet duct leading to an outlet port;

a presuction chamber with a presuction piston associated with an inlet side of said pump chamber, overflow means being provided for ductively connecting said presuction chamber to said pump chamber, said presuction chamber being closed during the pump stroke with respect to the pump chamber, and a dog operating for a valve closure means of said outlet valve and connected to an operation head for said pump piston, said dog shifting said valve closure means with respect to said pump piston at said stroke end position, said dog being provided on at least one of members provided by a neck of said pump piston and a piston shaft constructed to provide a reduction of a length extension of said piston shaft upon compression stresses.

3. The dispenser according to claim 1, wherein for operating said outlet valve, the presuction piston is displaceably mounted with respect to and on the pump piston, said presuction piston having a piston sleeve forming a larger piston end face at a rear end of said piston sleeve than at a front end proceeding toward the stroke end position, thereby providing said means for manually opening said outlet valve at lower fluid pressure and means for opening said outlet valve via fluid pressure at higher fluid pressure in said pump chamber.

4. The dispenser according to claim 1, wherein a rear end of said presuction piston is connected to a piston shaft, said rear end being closed with an end wall defining a substantially frustum-shaped valve closure member of said outlet valve on an outer circumference of said rear end, a valve seat providing an inner shoulder on a rear end of said pump piston associated with said outlet valve.

5. The dispenser according to claim 1, wherein said presuction chamber is bounded by a chamber body freely projecting into said casing and is annularly surrounded by said pump chamber having a common bottom wall with said presuction chamber, said presuction piston telescopically engaging said chamber body, and further comprising a return spring for said pump piston, located in said presuction chamber and being provided as a closing spring for said outlet valve.

6. The dispenser according to claim 1, wherein said outlet valve is partially opened only at said stroke end position, thereby providing a pressure relief for said pump chamber.

7. The dispenser according to claim 1, wherein at least one longitudinal channel is provided along a piston path of said thrust piston pump for venting said reservoir over a part of said pump stroke, a rear end of said longitudinal channel being closed by a piston lip of said piston unit in said initial position, a front end of said longitudinal channel being connected to the reservoir by a passage opening in an annular shoulder of said casing, said annular shoulder being connected to a rear end of said pump cylinder.

8. The dispenser according to claim 1, wherein a rear end of an inner space of said casing defining the cylinder is bounded by at least one inwardly bent jacket tongue provided in one part with a jacket portion of said casing, an operating head closing said rear end of said casing by receiving said jacket portion, said rear end projecting freely into said operating head.

9. The dispenser according to claim 1, wherein said casing is constructed in one piece with a cap provided for fixing to a container neck and having an inner socket sleeve providing an outer circumferential sealing face.

10. The dispenser according to claim 1, wherein said thrust piston pump is arranged to discharge a liquid media.

11. The dispenser according to claim 1, wherein said presuction piston provides a piston sleeve and a counter member, a rear end of said piston sleeve of said presuction piston being circumferentially and displaceably engaged by said counter member, for opening and closing an overflow valve of said overflow means.

12. The dispenser according to claim 1, wherein a dog is connected to an operating member for said pump piston, for operating said outlet valve.

13. The dispenser according to claim 1, wherein a chamber body forming the presuction chamber is located substantially axially in said pump chamber, said presuction piston being guided on a piston path formed by an outer circumferential surface of said chamber body.

14. The dispenser according to claim 13, wherein said overflow means has a slide valve between said presuction chamber and said pump chamber, overflow openings in a free end of said chamber body being freed at an end of a return stroke by a piston sealing lip of said presuction piston, said piston sealing lip providing a valve closure means, engaging said chamber body in all positions of said piston unit along the pump stroke.

15. The dispenser according to claim 1, wherein said overflow means between said presuction chamber and said pump chamber is closable with an overflow valve, means being provided for mechanically opening and closing said overflow valve as a function of motion of said piston unit in one of two opposite motion directions, respectively.

16. The dispenser according to claim 15, wherein said overflow valve has two valve parts displaceable with respect to one another, a first one of said valve parts being formed by an annular end of an associated piston sleeve of said presuction piston.

17. The dispenser according to claim 1, wherein said presuction piston is guided in a tubular neck on a rear end of said pump piston with a shaft provided on a rear end of said presuction piston and in a tubular neck on a rear end of said pump piston, said shaft being directly connected to a valve closure member of said outlet valve, said neck bounding a portion of said outlet duct and said outlet valve being located in the vicinity of a rear end of said pump piston connected to a piston shaft.

18. The dispenser according to claims 17 or 2 wherein said neck is widenable by compression, said neck of said pump piston being at least partly grasped on an outer circumference thereof against widening in said initial position, said neck being slideably guided on longitudinal ribs of a cylinder cover of said casing over most of a length extension of said neck.

19. The dispenser according to claims 17 or 2, wherein said neck is elastically longitudinally compressible with operation of the thrust piston pump and is constructed in one piece with a piston shaft and with said pump piston, said neck having a thinner jacket wall than adjacent shaft portions.

20. The dispenser according to claim 1, wherein said presuction piston has a substantially cylindrical piston sleeve formed as a separate component and located with a gap spacing relative to a piston sleeve of said pump piston, piston sealing lips being provided on an outer circumference of said pump piston and on an inner circumference of said presuction piston, said piston sealing lips being provided substantially in a same length section of said pump cylinder, said piston sleeves being located within one another with a limited clearance defined by said gap, thereby providing means for substantially completely emptying said pump chamber at said stroke end position.

21. The dispenser according to claim 2, wherein means are adapted to cooperate with said piston shaft for positively preventing said reduction of length extension of said piston shaft in said initial position.

22. A dispenser for manually dispensing media, said dispenser comprising:

at least one manually operable thrust piston pump having a casing and at least one piston unit with at least one pump piston, the piston unit being movable in at least one pump cylinder along a cylinder path over a pump stroke from an initial position to a stroke end position;

a pump chamber being defined between said pump cylinder and said pump piston, said pump chamber being connectable to an inlet for filling the pump chamber from a reservoir, and for discharge purposes being connected to an outlet duct leading to an outlet port;

a presuction chamber with a presuction piston associated with an inlet side of said pump chamber, overflow means being provided for ductively connecting said presuction chamber to said pump chamber, said presuction chamber being closed during the pump stroke with respect to the pump chamber, a rear end of a piston sleeve of said presuction piston being movably engaged in axially limited manner with an associated end wall of said presuction piston by wedge-shaped ring profiles provided on said rear end and said end wall, said piston sleeve being mounted on said end wall by a snap connection located on an inner circumference of said piston sleeve, said ring profiles forming valve parts of an overflow valve associated with said overflow means.

23. A dispenser for manually dispensing media, said dispenser comprising:

a casing providing a jacket portion and defining at least part of a pump chamber of a pump and having a rear end bounding an associated rear end of an inner space of said casing, wherein said rear end of said inner space is bounded by at least one inwardly bent jacket part provided in one part with said jacket portion of said casing.

24. The dispenser according to claim 23, wherein an operating head is provided for closing said rear end of said casing by receiving said jacket portion, said rear end projecting freely into said operating head.

* * * * *